Aug. 8, 1967          J. E. MELIN          3,334,434
EAR TAG AND TAG APPLYING TOOL
Filed June 8, 1965
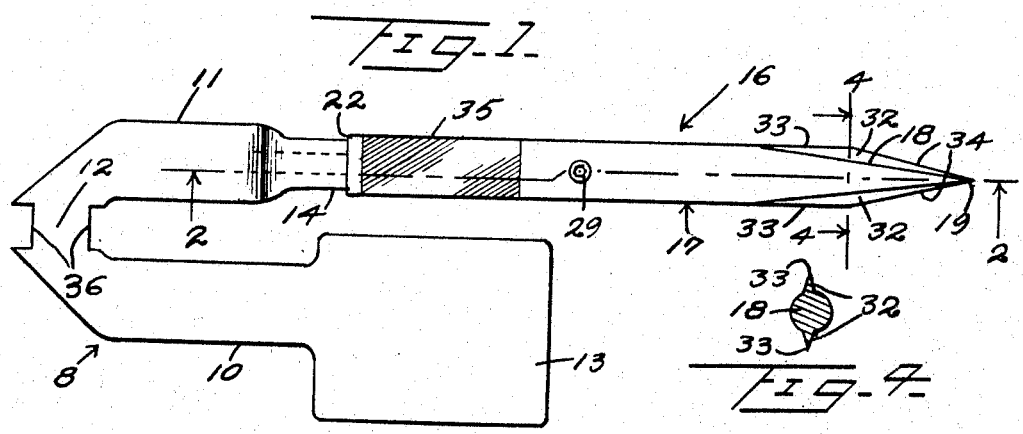
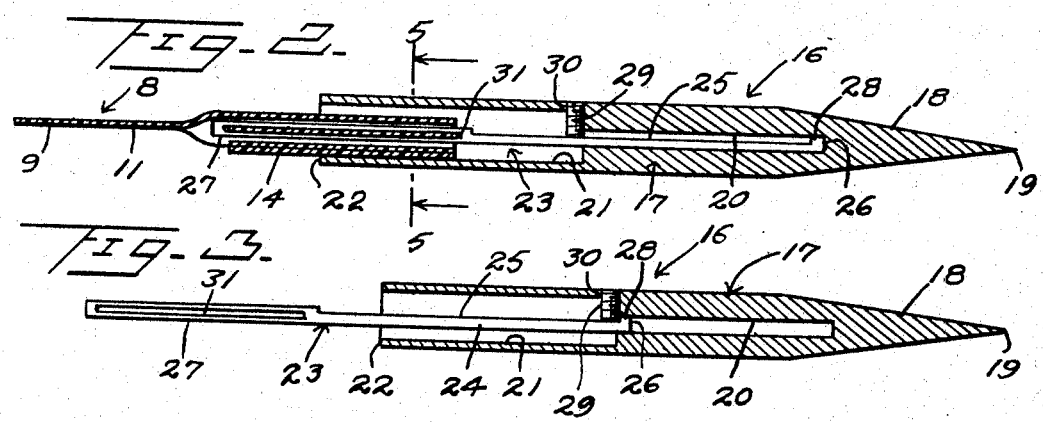
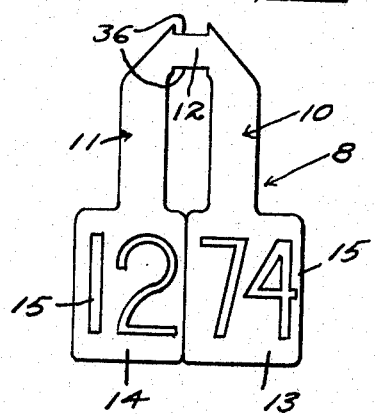
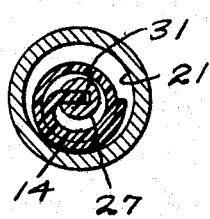
INVENTOR
JOHN E. MELIN
BY John N. Randolph
ATTORNEY

United States Patent Office 3,334,434
Patented Aug. 8, 1967

3,334,434
EAR TAG AND TAG APPLYING TOOL
John E. Melin, Box 55, Ten Sleep, Wyo. 82442
Filed June 8, 1965, Ser. No. 462,330
6 Claims. (Cl. 40—301)

ABSTRACT OF THE DISCLOSURE

An ear tag for a domestic animal and a tag applying tool which contains a part of the tag which passes through the ear with the tool as the tool pierces the ear, for accomplishing the piercing of the ear and the application of the tag thereto as a single operation.

This invention relates to a novel ear tag for a domestic animal and to a tool for piercing an animal's ear and for applying the tag to the ear in a single operation.

More particularly, an aim of the invention is to provide a novel tag adapted to contain identifying indicia and which is so constructed that a part thereof may be readily attached to and contained in the ear piercing tool, whereby said part will pass with the tool through the hole formed in the ear during the piercing operation to effect application of the tag to the ear.

Still another object of the invention is to provide a tool having novel means for engaging and confining a part of the ear tag during the ear piercing operation, to effect application of the tag to the ear.

Various other objects and advantages of the invention will hereinafter become more fully apparent from the following description of the drawing, illustrating a presently preferred embodiment thereof, and wherein:

FIGURE 1 is an elevational view showing the tag applying tool with the ear tag applied thereto;

FIGURE 2 is an enlarged fragmentary longitudinal sectional view taken substantially along the line 2—2 of FIGURE 1;

FIGURE 3 is a longitudinal sectional view of the tag applying tool, with a part thereof disposed in a different position from the position thereof as seen in FIGURE 2;

FIGURE 4 is an enlarged cross sectional view taken substantially along a plane as indicated by the line 4—4 of FIGURE 1;

FIGURE 5 is an enlarged cross sectional view taken substantially along a plane as indicated by the line 5—5 of FIGURE 2, and FIGURE 6 is a plan view of the ear tag.

Referring more specifically to the drawing, the ear tag in its entirety is designated generally 8 and is preferably formed from a flat piece of plastic 9, which may be rolled or flexed as seen in FIGURES 2 and 5 and which will normally return to its flat shape, as seen in FIGURE 6. The tag 8, which may be of any desired color, includes corresponding legs or branches 10 and 11 which are joined at corresponding ends thereof by a transversely extending bight portion 12. The legs 10 and 11 have corresponding laterally enlarged free end portions 13 and 14, respectively, located at the ends thereof disposed remote from the bight portion 12. Portions 13 and 14 may contain suitable identifying indicia 15.

The ear piercing and tag applying tool in its entirety is designated generally 16 and includes an elongated body 17 of circular cross section having a forward portion 18 which tapers to a point 19. As seen in FIGURES 2 and 3, the body 17 has an elongated restricted bore 20 in its forward part and which is closed at its forward end. The rear end of the bore 20 opens into the forward end of a large chamber 21, the rear end of which opens outwardly of the rear end 22 of the body 17.

A long slender rigid stem 23 includes a forward portion 24 which fits slidably in the bore 20 and which is recessed, as seen at 25, from near its forward end 26 to the rear portion 27 of said stem. The part 28 of the forward end 26 forms a lug which is disposed across the forward end of the restricted portion 25.

A setscrew 29 is threaded radially into the body 17 through a threaded bore 30 thereof which opens into the forward end of the chamber 21. In its advanced position of FIGURES 2 and 3, the setscrew 29 extends into the forward end of the chamber 21 and into the recessed or flattened portion 25 to provide a stop to be engaged by said lug 28 to prevent the stem portion 26 from being retracted out of the bore 20, as seen in FIGURE 3. The rear stem portion 27 has a deep groove 31 which extends nearly from end-to-end of said portion, as seen in FIGURE 3.

The tapered forward end 18 of the body has slicing blades 32 disposed on opposite sides thereof and in substantially the same plane, as seen in FIGURE 4. The blades 32 extend from end-to-end of the tapered portion 18 and have sharpened edges each including a rear portion 33 which extends forwardly from its rear end and a forward portion 34 which extends from the forward end of the edge portion 33 to the point 19. The edge portions 33 are disposed substantially parallel to one another and are spaced apart a distance equal to the diameter of the remainder of the body portion 17. The edge portions 34 converge relative to one another and merge with the point 19. The rear portion of the exterior of the body 17 may be roughened or knurled as seen at 35 to provide a handhold.

The rear stem portion 27 is grasped to pull the stem 23 rearwardly from its projected position of FIGURE 2, with the forward end 26 thereof abutting the forward end of the bore 20, to its retracted position of FIGURE 3, with the lug 28 abutting the stop 29 and the stem portion 27 disposed beyond the rear body end 22. One of the longitudinal edges of one of the tag portions 13 or 14 is then inserted into the groove 31, and said tag portion 13 or 14 is then wound around the stem portion 27, after which the stem 23 is displaced forwardly of the body 17, back to its position of FIGURE 2, so that a part of said rolled tag portion 13 or 14 will then be housed in the chamber 21, as illustrated in FIGURES 1, 2 and 5.

The ear of animal, not shown, is then penetrated by the point 19 and sliced by the cutting edges of the blades 32, so that the tapered forward portion 18 and blade 32 and thereafter the remainder of the body 17 can pass completely through the hole in the ear produced by the forward portion of the tool 16. It will be readily apparent that the tag portion 13 or 14 which engages in the chamber 21 will pass with the tool 16 through the hole in the ear, after which the leg 10 or 11 of which said tag portion 13 or 14 forms a part will also pass through the hole in the ear. The stem 23 is then retracted relative to the body 17 and back to its position of FIGURE 3, to permit the tag portion 13 or 14 to be disengaged from the stem portion 27 and its groove 31, so that said tag portion can resume its normal flat condition coplanar with the other tag portion. The bight portion 12 is positioned in the hole in the animal's ear and said portion 12 is notched in its inner and outer edges, as seen at 36, so as to more effectively retain its position in engagement with the hole in the ear. It will also be apparent that the adjacent inner longitudinal edges of the leg portions 13 and 14 will assume positions in abutting engagement with one another in the normal flat condition of the tag 8 as seen in FIGURE 6, to effectively retain the tag applied to the animal's ear.

Various modifications and changes are contemplated

I claim as my invention:

1. The combination of an ear tag and a tag applying tool comprising, a piercing tool including an elongated tool body having a tapered forward end defining a piercing point, said tool body being recessed to provide a chamber opening outwardly of the other rear end thereof, an ear tag engaging member carried by the tool body and slidably movable relative to said chamber; an ear tag formed of a substantially flat piece of flexible material which is capable of being flexed and which will return to its normal flat condition when released, said tag including a bight portion and branches extending from the bight portion each having a laterally enlarged free end, and means detachably connecting one of said free ends of the tag to said tag engaging member for retaining said free end of the tag rolled on the tag engaging member and housed therewith in said chamber.

2. An ear tag applying tool comprising a long slender tool body having a tapered forward end defining an ear piercing point, said body having a chamber opening outwardly of the opposite rear end thereof adapted to accommodate therein a rolled end of an ear tag, a stem slidably mounted in the tool body, means retaining the stem slidably connected to the tool body, and said stem having means in which a part of said rolled end of the tag is adapted to be anchored to retain said rolled end wound on the stem.

3. An ear tag applying tool as in claim 2, said last mentioned means comprising a groove formed in the stem adapted to receive a longitudinal edge of said end of the tag.

4. An ear tag applying tool as in claim 2, and slicing blades forming a part of the tool body and disposed on opposite sides of said tapered end, said blades having corresponding cutting edges including substantially parallel rear portions and converging forward portions, said forward portions converging with one another and with said point.

5. An ear tag for animals formed from a flat piece of a flexible plastic and comprising two corresponding legs, a transverse portion extending between and connecting said legs to one another at corresponding ends of the legs, said legs extending in the same direction from the transverse portion and being disposed coplanar with one another and with the transverse portion, and said legs having outer end portions disposed remote from said transverse portion and which are laterally enlarged relative to remainders of said legs.

6. An animal ear tag as in claim 5, said laterally enlarged leg portions having inner edges normally disposed in engagement with one another.

References Cited
UNITED STATES PATENTS

| | | | |
|---|---|---|---|
| 460,138 | 9/1891 | Hornberger | 128—330 |
| 1,606,881 | 11/1926 | Lenk | 40—302 |
| 2,024,699 | 12/1935 | Meltzer | 119—135 |

EUGENE R. CAPOZIO, *Primary Examiner.*

W. GRIEB, *Assistant Examiner.*